(12) United States Patent
Toh et al.

(10) Patent No.: US 8,566,719 B2
(45) Date of Patent: Oct. 22, 2013

(54) APPARATUS AND METHOD FOR CONTROLLING A SOUND REPRODUCTION APPARATUS

(75) Inventors: Boon Keat Eddy Toh, Singapore (SG); Jeng Khim Tan, Singapore (SG); Cunsheng Vincent Dong, Singapore (SG)

(73) Assignee: Creative Technology Ltd, Singapore (SG)

( * ) Notice: Subject to any disclaimer, the term of this patent is extended or adjusted under 35 U.S.C. 154(b) by 130 days.

(21) Appl. No.: 13/131,575

(22) PCT Filed: Nov. 16, 2009

(86) PCT No.: PCT/SG2009/000427
§ 371 (c)(1), (2), (4) Date: May 26, 2011

(87) PCT Pub. No.: WO2010/062263
PCT Pub. Date: Jun. 3, 2010

(65) Prior Publication Data
US 2011/0246886 A1   Oct. 6, 2011

(30) Foreign Application Priority Data
Nov. 28, 2008   (SG) .............................. 200808853-6

(51) Int. Cl.
*G06F 3/00*   (2006.01)

(52) U.S. Cl.
USPC ......................................... 715/716; 715/863

(58) Field of Classification Search
USPC .......................................... 715/716, 863, 719
See application file for complete search history.

(56) References Cited

U.S. PATENT DOCUMENTS

| | | | |
|---|---|---|---|
| 8,174,503 B2 * | 5/2012 | Chin | 345/173 |
| 2003/0067450 A1 | 4/2003 | Thursfield et al. | |
| 2004/0030425 A1 | 2/2004 | Yeakel et al. | |
| 2006/0105482 A1 * | 5/2006 | Alferink et al. | 438/22 |
| 2007/0276525 A1 | 11/2007 | Zadesky et al. | |
| 2008/0036743 A1 * | 2/2008 | Westerman et al. | 345/173 |
| 2008/0084400 A1 * | 4/2008 | Rosenberg | 345/173 |
| 2008/0165255 A1 * | 7/2008 | Christie et al. | 348/207.99 |
| 2011/0246886 A1 * | 10/2011 | Toh et al. | 715/716 |

FOREIGN PATENT DOCUMENTS

EP   1942401 A1   7/2008

\* cited by examiner

*Primary Examiner* — Steven Sax
*Assistant Examiner* — David Choi
(74) *Attorney, Agent, or Firm* — Creative Technology Ltd (57) ABSTRACT

There is provided a control apparatus and method for controlling a sound reproduction apparatus. The control apparatus and method enables control of at least one parameter of audio reproduction depending on contact with a touch sensitive panel. The parameters which may be controlled include, for example, volume, bass, treble, equalizer settings and the like. The functions of the sound reproduction apparatus which may be controlled include, for example, radio channel selection, track selection, album selection and the like.

17 Claims, 7 Drawing Sheets

APPARATUS AND METHOD FOR CONTROLLING A SOUND REPRODUCTION APPARATUS

FIELD OF INVENTION

The present invention relates to the field of controlling a sound reproduction apparatus. Specifically, the invention relates to a control apparatus and method for controlling both parameters of audio reproduction, and functionalities of a sound reproduction apparatus.

BACKGROUND

When a sound reproduction apparatus such as, for example, speakers, headphones, earphones and the like is used for reproduction of sound, it is typical that some form is control is required for parameters of the sound emanating from the sound reproduction apparatus. This is because adjustment of the parameters of the sound such as, for example, volume, bass, treble, equalizer settings and so forth may enable a user of the sound reproduction apparatus to customize the sound emanating from the sound reproduction apparatus to an audio output which suits the user's desires.

Typically, the controls for the sound reproduction apparatus may be either integrated into the sound reproduction apparatus or separate from the sound reproduction apparatus. For example, the Gigaworks T20 speakers from Creative Technology Ltd includes a plurality of dials on the speakers, with each dial being for adjustment of output parameters like, for example, volume levels and bass levels. Typically, markings are included for each dial, with the markings being used to indicate a quantitative level for a parameter of output from the sound reproduction apparatus. In such an instance, how each dial is calibrated directly affects a manner of use relating to the dial. Each dial may not provide a desirable sense of control for the user. For example, a dial may have eight levels being marked for volume control. However, even though the resolution of the dial allows the user to select any of the eight levels, the user may not be able to select a parameter level in-between any of the aforementioned eight levels because of the resolution of the dial. This is undesirable for a user.

In some hi-fi component systems, either dials or tactile switches may be used to adjust output parameters. In some instances, the quantitative (numerical) level for the parameter appears on a digital display of the hi-fi component systems. In this instance, the user has no direct interaction with the quantitative level for the parameter as the user controls the quantitative level with an external controller such as, for example, a rotary dial, remote control buttons, and the like and there is correspondingly a disjointed interaction for the user when controlling the parameter.

Alternatively, the Popz speakers from Creative Technology Ltd and most headphones/earphones do not have integrated control mechanisms which are able to vary parameters of the audio output. In such instances, a source of the audio output may be able to control parameters of the audio work product output from such speakers/headphones/earphones. For example, when a media player like a Zen Vision from Creative Technology Ltd is connected to a sound reproduction apparatus which does not have integrated control mechanisms, parameters of output from the sound reproduction apparatus are solely controlled by the media player. This is also a disjointed interaction between the user and the speakers/headphones/earphones when controlling the parameter of the audio output emanating from the sound reproduction apparatus.

Currently, the control of parameters of output from sound reproduction apparatus do not allow a direct interaction between the user who wishes to control parameters of audio output from sound reproduction apparatus and the sound reproduction apparatus. As such, there is a lack of an intuitive control for parameters of audio output from sound reproduction apparatus. In addition, it would also be desirable if the capability to control functionalities of the sound reproduction apparatus is also enabled together with the capability to control parameters of output from the sound reproduction apparatus through a direct interaction between the user and the sound reproduction apparatus.

SUMMARY

In a first aspect, there is provided a control apparatus for controlling at least one parameter of audio reproduction of a sound reproduction apparatus. The control apparatus includes a touch sensitive panel; a controller coupled to the touch sensitive panel for processing data from the touch sensitive panel relating to an initial contact position, direction of subsequent movement, a rate of the movement and a departing contact position of a first appendage on the touch sensitive panel; and a visual indicator for denoting a level of at least the first parameter, the visual indicator being coupled to the controller with a final appearance of the visual indicator being determined by the data processed by the controller. The control apparatus may be either incorporated into the sound reproduction apparatus or separate from the sound reproduction apparatus.

Preferably, a level of the first parameter is increased by primary increments when the first appendage is moved in a first direction, and the level of the first parameter is decreased by primary decrements when the first appendage is moved in a second direction, with the visual indicator appearing to correspondingly vary visually with a direction of movement of the first appendage when the first appendage is in contact with the touch sensitive panel.

The touch sensitive panel may be transparent and is overlaid on the visual indicator. It is preferable that the controller ignores data from the touch sensitive panel when the initial contact position of the first appendage fails to substantially coincide with a position where a current level of the first parameter is shown on the visual indicator. The visual indicator may include visual indicia such as, for example, a plurality of illumination sources, a plurality of LEDs, an LCD panel and the like. Each of the plurality of LEDs may be able to vary a level of brightness.

The subsequent movement may be in a direction such as, for example, latitudinal, longitudinal, radial, any combination of the aforementioned and so forth.

It is preferable that the controller coupled to the touch sensitive panel is also able to process data from the touch sensitive panel relating to a first contact position, direction of ensuing movement and a second contact position of a second appendage on the touch sensitive panel. Advantageously, a mode of the control apparatus switches from a first parameter control mode to a fine-tuning first parameter mode when the controller recognizes contact positions of the first appendage and the second appendage to be substantially side-by-side when the first appendage and the second appendage are in contact with the touch sensitive panel. In the fine-tuning mode, the level of the first parameter is increased in secondary increments when the contact positions of the first appendage and the second appendage that are substantially side-by-side are moved in the first direction, and the level of the first parameter is decreased in secondary decrements when the contact positions of the first appendage and the second appendage that are substantially side-by-side are moved in the second direction.

It is also preferable that a mode of the control apparatus switches from a first parameter control mode to a second parameter control mode when the controller recognizes contact positions of the first appendage and the second appendage to be either approaching one another or distancing from one another. Advantageously, the visual indicator denotes a level of the second parameter when the control apparatus switches from the first parameter control mode to the second parameter control mode. The level of a second parameter is increased when the contact positions of the first appendage and the second appendage are approaching one another, and the level of the second parameter is decreased when the contact positions of the first appendage and the second appendage are distancing from one another. Alternatively, the level of a second parameter is increased when the contact positions of the first appendage and the second appendage are distancing from one another, and the level of the second parameter is decreased when the contact positions of the first appendage and the second appendage are approaching one another.

Each of the first and second appendages may be, for example, any finger, thumb, and any toe. The first parameter and the second parameter of audio reproduction may be, for example, volume, bass, treble, equalizer settings and the like. It should be appreciated that the secondary increment is less than the primary increment and the secondary decrement is less than the primary decrement.

The control apparatus may further include further include instantaneously either reducing the level of the first parameter to a zero level or increasing the level of the first parameter to a maximum level when moving the first appendage at a rate of movement greater than a pre-determined rate.

Preferably, a mode of the control apparatus switches from a first parameter control mode to a functional control mode for the sound reproduction apparatus when the controller recognizes contact positions of the first appendage and the second appendage to be substantially side-by-side together with when either one of the first appendage and the second appendage taps on the touch sensitive panel. The functional control mode may controls any function such as, for example, channel selection, track selection, album selection and the like. The visual indicator may also denotes a representation of any function such as, for example, channel selection, track selection, album selection and so forth. It is preferable that the level of the function may be varied when either one of the first appendage and the second appendage taps on the touch sensitive panel.

In a second aspect, there is provided a method for controlling at least one parameter of audio reproduction of a sound reproduction apparatus using a touch sensitive panel over-laid on a visual indicator of a first parameter visible though the touch sensitive panel. The method includes contacting the touch sensitive panel using a first appendage at a position where a current level of the first parameter is shown on the visual indicator; moving the first appendage in either a first direction or a second direction; and removing the first appendage from contact with the touch sensitive panel.

Preferably, the level of the first parameter is increased by primary increments when the appendage is moved in the first direction, and the level of the first parameter is decreased by primary decrements when the appendage is moved in the second direction, with the visible indicator appearing to correspondingly vary with a direction of movement of the first appendage when the first appendage is in contact with the touch sensitive panel. The visual indicator includes visual indicia such as, for example, a plurality of illumination sources, a plurality of LEDs, an LCD panel and so forth. Each of the plurality of LEDs may be able to vary a level of brightness.

The first and the second directions may be, for example, latitudinal, longitudinal, radial and any combination of the aforementioned.

It is preferable that there is no change in the level of the first parameter when an initial contact position of the first appendage fails to substantially coincide with the position where a current level of the first parameter is shown on the visual indicator.

It is preferable that when the touch sensitive panel is contacted using a second appendage, a first parameter control mode switches to a fine-tuning first parameter mode when contact positions of the first appendage and the second appendage are detected to be substantially side-by-side when the first appendage and the second appendage are in contact with the touch sensitive panel. The level of the first parameter is increased in secondary increments when the contact positions of the first appendage and the second appendage that are substantially side-by-side are moved in the first direction, and the level of the first parameter is decreased in secondary decrements when the contact positions of the first appendage and the second appendage that are substantially side-by-side are moved in the second direction. The secondary increment is less than the primary increment and the secondary decrement is less than the primary decrement.

It is also preferable that when the touch sensitive panel is contacted using a second appendage, a first parameter control mode switches to a second parameter control mode when contact positions of the first appendage and the second appendage are detected to be either approaching one another or distancing from one another. The level of a second parameter is increased when the contact positions of the first appendage and the second appendage are approaching one another, and the level of the second parameter is decreased when the contact positions of the first appendage and the second appendage are distancing from one another. Alternatively, the level of a second parameter is increased when the contact positions of the first appendage and the second appendage are distancing from one another, and the level of the second parameter is decreased when the contact positions of the first appendage and the second appendage are approaching one another.

Each of the first and second appendages may be any finger, thumb, and any toe. The first parameter and the second parameter of audio reproduction may include, for example, volume, bass, treble, equalizer settings and the like.

Preferably, the method may further include instantaneously either reducing the level of the first parameter to a zero level or increasing the level of the first parameter to a maximum level when moving the first appendage at a rate of movement greater than a pre-determined rate.

In a third aspect, there is provided a method for controlling a sound reproduction apparatus using a touch sensitive panel over-laid on a visual indicator of a representation of a function visible through the touch sensitive panel. The method includes contacting the touch sensitive panel with a first appendage and a second appendage, the first appendage and the second appendage being substantially side-by-side together; and tapping on the touch sensitive panel by either one of the first appendage and the second appendage. It is advantageous that a level of the function is varied when either one of the first appendage and the second appendage taps on the touch sensitive panel.

The functional control mode may control any function such as, for example, channel selection, track selection, album selection and so forth. The visual indicator may also denote a representation of the aforementioned functions.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
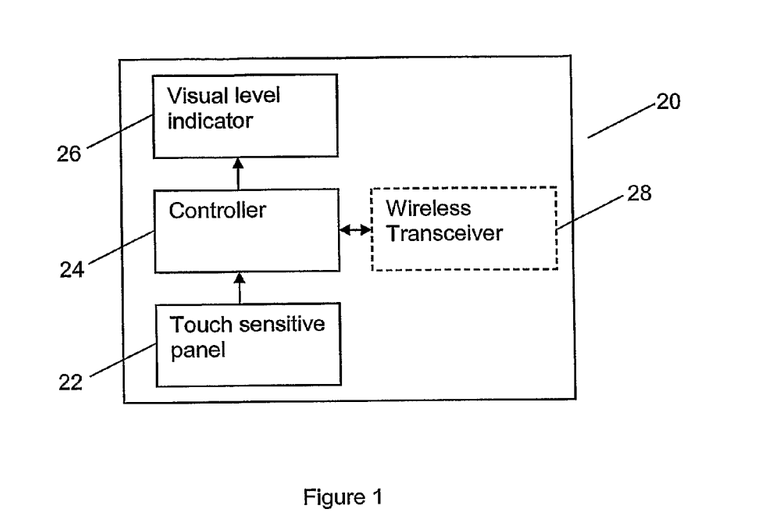
FIG. 1 shows a schematic diagram of components of a control apparatus of the invention.

Referring to FIG. 1, there is shown a schematic diagram of components of a control apparatus 20 for both controlling at least one parameter of audio reproduction of a sound reproduction apparatus and controlling at least one functionality of the sound reproduction apparatus. A first parameter of audio reproduction may include, for example, volume, bass, treble, equalizer settings and so forth. The at least one functionality of the sound reproduction apparatus may include, for example, channel selection, track selection, album selection, and the like. The sound reproduction apparatus may be, for example, a speaker system comprising at least one loudspeaker, a set of headphones, a set of earphones and so forth.

The control apparatus 20 may include a touch sensitive panel 22 which is able to detect at least one instance of contact by at least one appendage. The touch sensitive panel 22 is preferably able to simultaneously detect more than one instance of contact. Furthermore, contact with the touch sensitive panel 22 may trigger some form of feedback effect such as, for example, audible feedback, visual feedback, haptic feedback, and so forth. The feedback effect may be for indicating confirmation of contact with the touch sensitive panel 22.

The control apparatus 20 may also include a controller 24 which is coupled to the touch sensitive panel 22 for processing data from the touch sensitive panel 22. The data from the touch sensitive panel 22 may relate to, for example, an initial contact position, direction of subsequent movement, a rate of the movement, a departing contact position of a first appendage on the touch sensitive panel 22 and so forth. The subsequent movement may be in a direction such as, for example, latitudinal, longitudinal, radial, any combination of the aforementioned and so forth. A more detailed description of the contact on the touch sensitive panel 22 will be provided in a subsequent portion.

The control apparatus 20 also includes a visual indicator 26 for denoting a level of the at least one parameter, the visual indicator 26 being coupled to the controller 24. A final appearance of the visual indicator 26 may be determined by the data processed by the controller 24. The visual indicator 26 may include visual indicia, such as, for example, a plurality of illumination sources, a plurality of LEDs or an LCD panel. Each illumination source may include either at least one bulb or at least one LED. Each of the plurality of LEDs may be able to vary a level of brightness. The level of brightness of each LED may be varied to denote a different level of the at least one parameter. In addition, The visual indicator 26 may be, for example, a series of dots as shown in FIGS. 2-9 (the dots being of increasing diameter when viewed from left to right), a series of bars (the bars being of increasing height when viewed from left to right), a series of dots of the same size, a series of dots of the same size closely arranged with each other to appear as a line, and so forth. The visual indicator 26 will provide a visual indication of a current level of the at least one parameter.

The touch sensitive panel 22 may be transparent and may be over-laid on the visual indicator 26. This overlaying arrangement of the touch sensitive panel 22 on the visual indicator 26 in the control apparatus 20 is shown in FIGS. 2-9 and will be described in greater detail in a subsequent portion.

The control apparatus 20 may be either incorporated into the sound reproduction apparatus or separate from the sound reproduction apparatus. An instance where the control apparatus 20 is separate from the sound reproduction apparatus may be where the control apparatus 20 is incorporated in a remote control for the sound reproduction apparatus. The remote control may be either wired or wireless. In the instance where the remote control with the control apparatus 20 is wireless, the control apparatus 20 may include a wireless transceiver 28. The wireless transceiver 28 may transmit instructions from the controller 24 to the sound reproduction apparatus, and may also receive data from the sound reproduction apparatus which may be processed by the controller 24. The data from the sound reproduction apparatus may include information on at least a current level of the first parameter of audio reproduction. Consequently, the visual indicator 26 received instructions from the controller 24 to indicate the level of the first parameter.

It should be noted that the arrangement of the various components of the control apparatus 20 may be configured in a manner which would provide the user with a direct interaction with a visual indication of the level of the at least one parameter.

Figure 2:
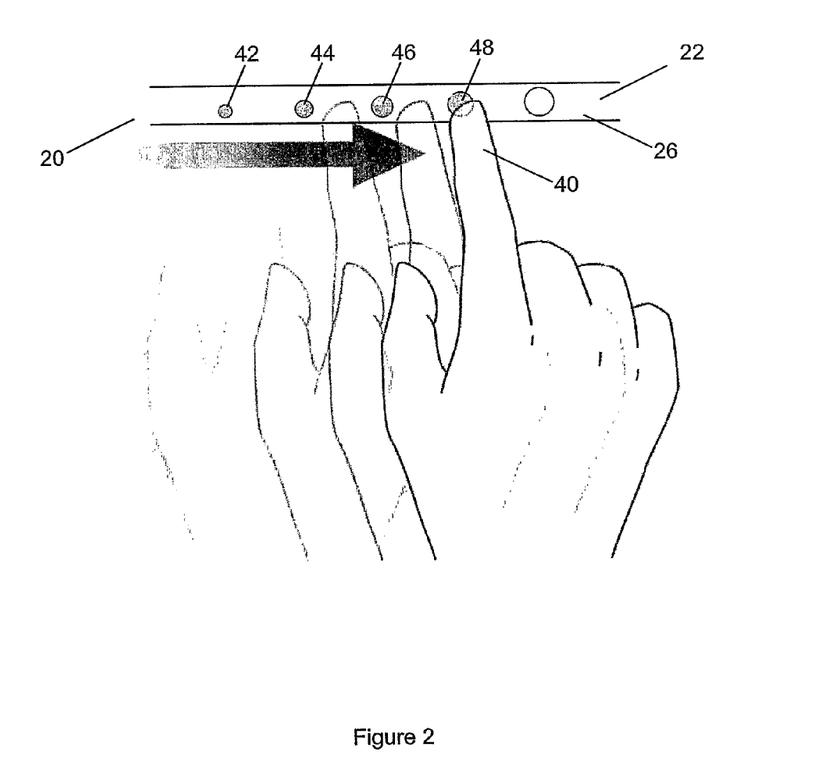
FIG. 2 shows a first instance during use of the control apparatus.

Referring to FIG. 2, there is shown a first instance during use of the control apparatus 20. In the first instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. A first appendage 40 (index finger in this instance) of the user is shown contacting the touch sensitive panel 22. The first appendage 40 makes a first contact with a first dot 42, the first dot 42 being either lit or unlit, where shading of each dot in the Figures representing a lit state. When the first dot 42 is unlit, it indicates that the first parameter of audio reproduction is at a zero level at that instance. When the first dot 42 is lit and other dots are not lit, it indicates that the first parameter of audio reproduction is at a first level above the zero level. For this instance and the following instances described later, the first parameter may be volume of audio reproduction.

The controller 24 of the control apparatus 20 typically ignores data from the touch sensitive panel 22 when the initial contact position of the first appendage 40 fails to substantially coincide with a position where a current level of the first parameter is shown on the visual indicator 26. It should be noted that "substantially coincide with" includes either at or around the position where the current level of the first parameter is shown on the visual indicator 26. Given that an unlit first dot 42 indicates that the first parameter of audio reproduction is at a zero level at that instance, the controller 24 will not ignore data from the touch sensitive panel 22 when the first appendage 40 makes the first contact with the unlit first dot 42 since the unlit first dot indicates zero level of the first parameter of audio reproduction (ie current level of the first parameter of audio reproduction).

The first appendage 40 of the user is shown moving from left to right while in constant contact with the touch sensitive panel 22. The first appendage 40 is shown moving from the first dot 42 past second dot 44, third dot 46 to fourth dot 48. The increasing diameter of the dots of the visual indicator 26 aids in visually indicating an increase in the level of the first parameter when the first appendage 40 moves in a direction where the diameter of the dots increases. When a subsequent dot is lit, it typically indicates that the first parameter has increased by a primary increment. Referring to FIG. 2, the fourth dot 48 is lit which indicates that the first parameter is at a fourth level above the zero level. It should be noted that the first parameter at the fourth level is quantitatively greater than the first parameter at the first level. Thus, when the first appendage 40 of the user is moved from left to right, there should be an increase in the level of the first parameter. It should also be noted that there is a direct relationship between movement of the first appendage with an appearance of the visual indicator 26.

Figure 3:
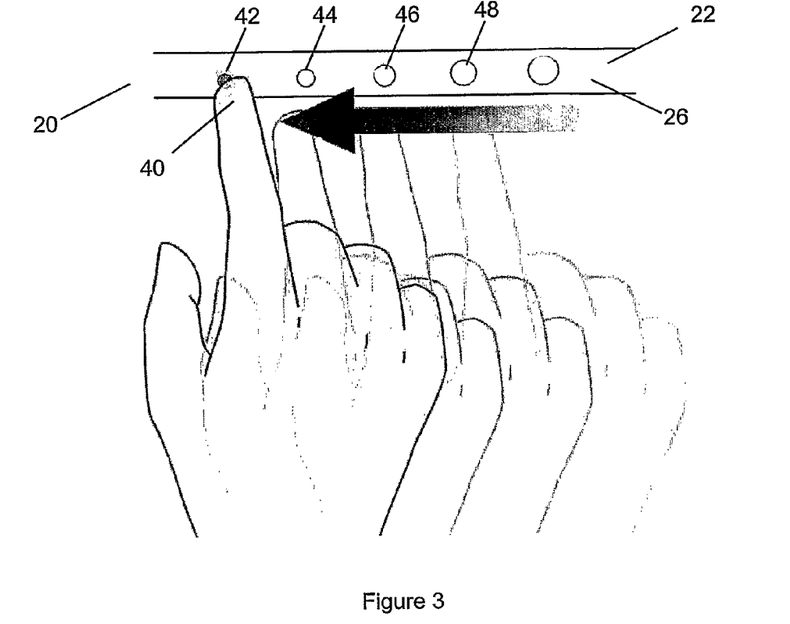
FIG. 3 shows a second instance during use of the control apparatus.

Referring to FIG. 3, there is shown a second instance during use of the control apparatus 20. It should be noted that the second instance shown in FIG. 3 shows an instance subsequent to the first instance shown in FIG. 2. However, while the second instance is not necessarily immediately subsequent to the first instance, there should not be any intervening event(s) which varies the level of the first parameter, and correspondingly, an appearance on the visual indicator 26 between the first and second instances.

In the second instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. The first appendage 40 (index finger) of the user is shown contacting the touch sensitive panel 22. The first appendage 40 makes a first contact with the fourth dot 48, the fourth dot 48 being lit, where shading of each dot in the Figures representing a lit state. When the fourth dot 48 is lit, it indicates that the first parameter of audio reproduction is at the fourth level above the zero level.

The controller 24 of the control apparatus 20 typically ignores data from the touch sensitive panel 22 when the initial contact position of the first appendage 40 fails to substantially coincide with a position where a current level of the first parameter is shown on the visual indicator 26. It should be noted that "substantially coincide with" includes either at or around the position where the current level of the first parameter is shown on the visual indicator 26. Given that the first instance ends with the fourth dot 48 being lit, the controller 24 will not ignore data from the touch sensitive panel 22 when the first appendage 40 makes the first contact with the lit fourth dot 48 (ie current level of the first parameter of audio reproduction) of the visual indicator 26.

The first appendage 40 of the user is shown moving from right to left while in constant contact with the touch sensitive panel 22. The first appendage 40 is shown moving from the fourth dot 48 past third dot 46, second dot 44 to first dot 42. The decreasing diameter of the dots of the visual indicator 26 aids in visually indicating a decrease in the level of the first parameter when the first appendage 40 moves in a direction where the diameter of the dots decreases. When a subsequent dot is unlit, it typically indicates that the first parameter has decreased by a primary increment. Referring to FIG. 2, only the first dot 42 is lit which indicates that the first parameter is at a first level above the zero level. It should be noted that the first parameter at the first level is quantitatively less than the first parameter at the fourth level. Thus, when the first appendage 40 of the user is moved from right to left, there should be a decrease in the level of the first parameter. It should also be noted that there is a direct relationship between movement of the first appendage with an appearance of the visual indicator 26.

Figure 4:
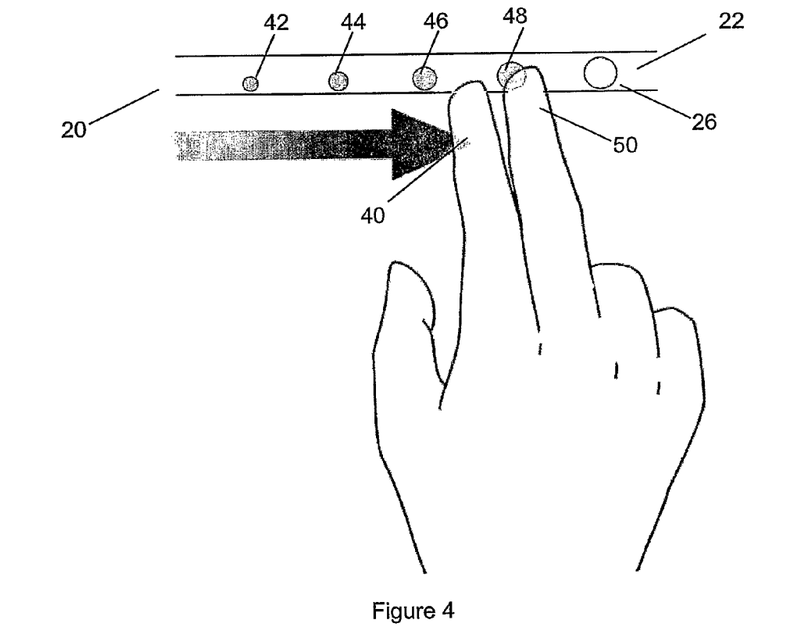
FIG. 4 shows a third instance during use of the control apparatus.

With reference to FIG. 4, there is shown a third instance during use of control apparatus 20. The controller 24 coupled to the touch sensitive panel 26 may also be able to process data from the touch sensitive panel 26 relating to a first contact position, direction of ensuing movement and a second contact position of a second appendage 50 on the touch sensitive panel 26. A mode of the control apparatus 20 may switch from a first parameter control mode to a fine-tuning first parameter mode when the controller 24 recognizes contact positions of the first appendage 40 and the second appendage 50 to be substantially side-by-side (as shown in FIG. 4) when the first appendage 40 and the second appendage 50 are in contact with the touch sensitive panel. It should be noted that side-by-side may include next to each other and slightly spaced apart. There is no necessity for the initial contact positions of both the first appendage 40 and the second appendage 50 to substantially coincide with a position where a current level of the first parameter is shown on the visual indicator 26 in order to switch the mode from a first parameter control mode to a fine-tuning first parameter mode.

It should be noted that the third instance shown in FIG. 4 is also subsequent to the first instance shown in FIG. 2. However, while the third instance is not necessarily immediately subsequent to the first instance, there should not be any intervening event(s) which varies the level, and correspondingly, an appearance on the visual indicator 26 between the first and third instances.

In the third instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. Both the first appendage 40 (index finger) and the second appendage 50 (middle finger) of the user are shown contacting the touch sensitive panel 22. The second appendage 50 is shown making a first contact with the fourth dot 48, the fourth dot 48 being lit, where shading of each dot in the Figures representing a lit state. The fourth dot 48 which is lit represents the current level of the first parameter of audio reproduction.

In the third instance, contact positions of the first appendage 40 and the second appendage 50 are substantially side-by-side during contact with the touch sensitive panel 22. This causes the controller 24 to switch a mode of the control apparatus 20 from the first parameter control mode to the fine-tuning first parameter mode.

Referring to FIG. 4, both the first appendage 40 and the second appendage 50 of the user are shown moving from left to right while side-by-side, and while in constant contact with the touch sensitive panel 22. When the control apparatus 20 is in the fine-tuning first parameter mode, moving the first appendage 40 side-by-side with the second appendage 50 in a direction where the diameter to the dots increases causes the level of the first parameter to be increased by a secondary increment. The secondary increment of the fine-tuning first parameter mode is quantitatively less than the primary increment of the first parameter control mode. Thus, when both the first appendage 40 and the second appendage 50 of the user is moved side-by-side from left to right, there should be an increase in the level of the first parameter, but the increase in the level is not sufficient to light up a subsequent dot of the visual indicator 26. Thus, in the fine-tuning first parameter mode, the first parameter is adjusted in-between the levels shown on the visual indicator 26.

Furthermore, while the third instance shows the second appendage 50 making the first contact with the fourth dot 48 (ie current level of the first parameter of audio reproduction), there is no difference if it is the first appendage 40 which makes the first contact with the fourth dot 48 (ie current level of the first parameter of audio reproduction). Each of the first 40 and second appendages 50 may be, for example, any finger, thumb, any toe and so forth.

Figure 5:
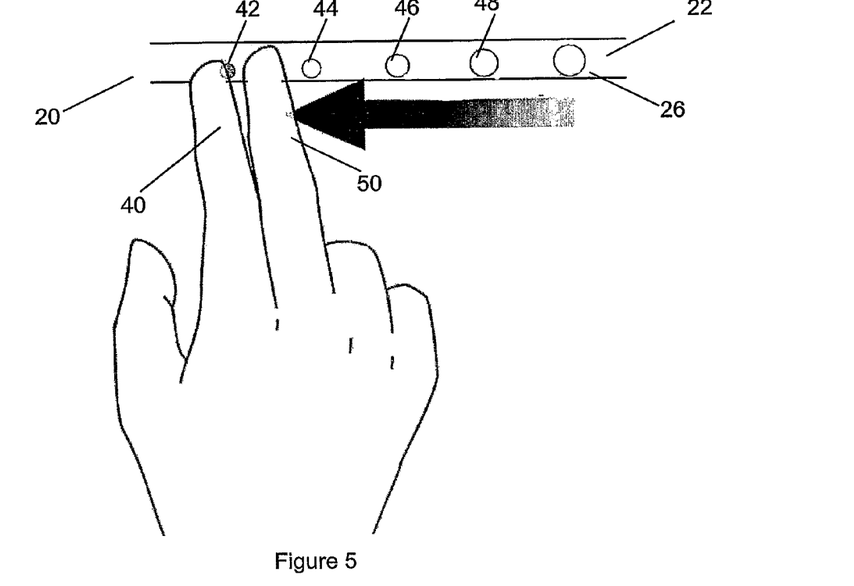
FIG. 5 shows a fourth instance during use of the control apparatus.

It should be noted that a fourth instance shown in FIG. 5 is subsequent to the second instance shown in FIG. 3. However, while the fourth instance is not necessarily immediately subsequent to the second instance, there should not be any intervening event(s) which varies the level and correspondingly, an appearance on the visual indicator 26 between the second and fourth instances.

In the fourth instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. Both the first appendage 40 (index finger) and the second appendage 50 (middle finger) of the user are shown contacting the touch sensitive panel 22. The first appendage 40 is shown making a first contact with the first dot 42, the first dot 42 being lit, where shading of each dot in the Figures representing a lit state. The first dot 42 which is lit represents the current level of the first parameter of audio reproduction.

In the fourth instance, contact positions of the first appendage 40 and the second appendage 50 are substantially side-by-side during contact with the touch sensitive panel 22. This causes the controller 24 to switch a mode of the control apparatus 20 from the first parameter control mode to the fine-tuning first parameter mode. There is no necessity for initial contact positions of both the first appendage 40 and the second appendage 50 to substantially coincide with a position where a current level of the first parameter is shown on the visual indicator 26 in order to switch the mode from a first parameter control mode to a fine-tuning first parameter mode.

Referring to FIG. 5, both the first appendage 40 and the second appendage 50 of the user are shown moving from right to left while side-by-side, and while in constant contact with the touch sensitive panel 22. When the control apparatus 20 is in the fine-tuning first parameter mode, moving the first appendage 40 side-by-side with the second appendage 50 in a direction where the diameter to the dots decreases causes the level of the first parameter to be decreased by a secondary decrement. The secondary decrement of the fine-tuning first parameter mode is quantitatively less than the primary decrement of the first parameter control mode. Thus, when both the first appendage 40 and the second appendage 50 of the user is moved side-by-side from right to left, there should be a decrease in the level of the first parameter, but the decrease in the level is not sufficient to remove illumination of a dot of the visual indicator 26. Thus, in the fine-tuning first parameter mode, the first parameter is adjusted in-between the levels shown on the visual indicator 26.

Furthermore, while the fourth instance shows the first appendage 40 making the first contact with the first dot 42, there is no difference if the second appendage 50 makes the first contact with the first dot 42. Each of the first 40 and second appendages 50 may be; for example, any finger, thumb, any toe and so forth.

Figure 6:
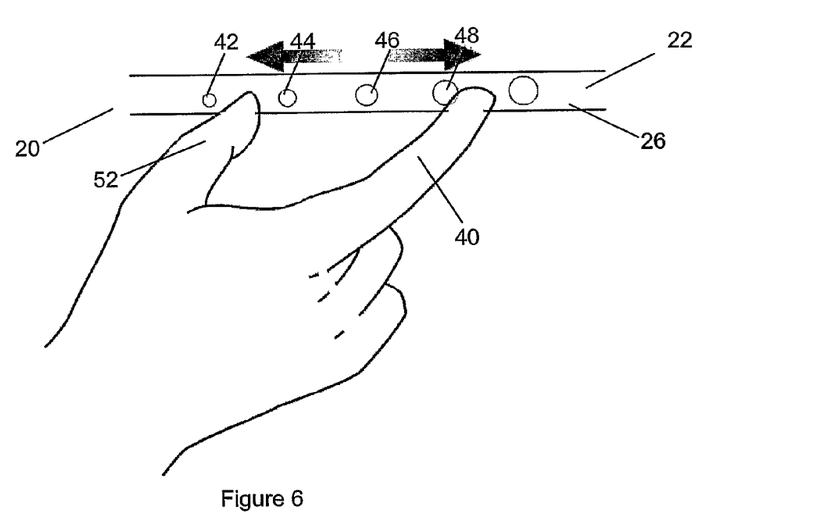
FIG. 6 shows a fifth instance during use of the control apparatus.
Figure 7:
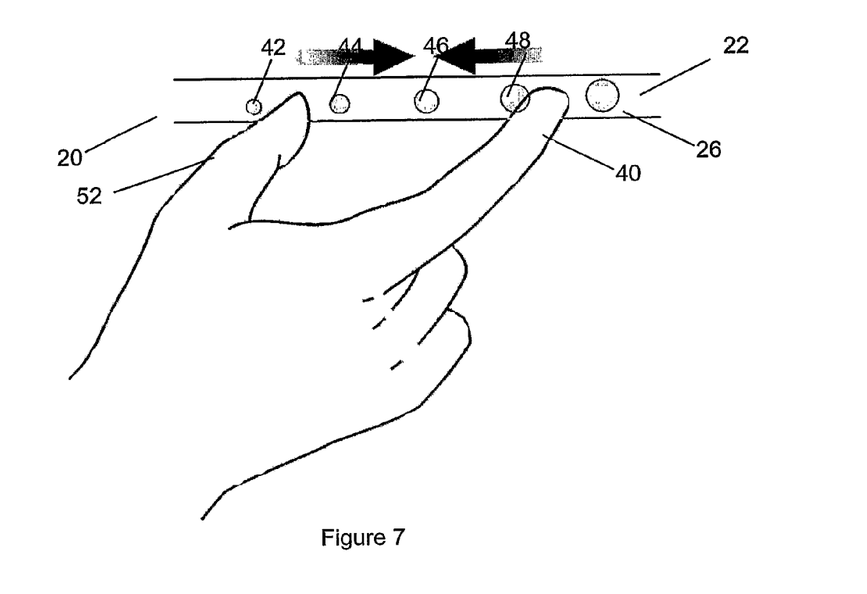
FIG. 7 shows a sixth instance during use of the control apparatus.

Referring to FIG. 6, there is shown a fifth instance during use of the control apparatus 20. The controller 24 coupled to the touch sensitive panel 26 may also be able to process data from the touch sensitive panel 26 relating to a first contact position, direction of ensuing movement and a second contact position of a second appendage 50 on the touch sensitive panel 26. A mode of the control apparatus 20 switches from a first parameter control mode to a second parameter control mode when the controller 24 recognizes contact positions of the first appendage 40 and a third appendage 52 to be either approaching one another (as shown in FIG. 7) or distancing from one another (as shown in FIG. 6). There is no necessity for the initial contact positions of either the first appendage 40 and the third appendage 52 to substantially coincide with a position where a current level of the first parameter is shown on the visual indicator 26 in order to switch the mode from the first parameter control mode to the second parameter control mode. For the sake of illustration, the first parameter is shown to be volume for audio reproduction. However, the first parameter need not be limited to volume. Each of the first parameter and the second parameter of audio reproduction may also be, for example, bass, treble, equalizer settings and so forth. It should be noted that the fifth instance shown in FIG. 6 may occur at any time when the user desires control of the second parameter.

In the fifth instance, the touch sensitive panel 22 is overlaid on the visual indicator 26. The touch sensitive panel 22 is transparent so that the visual indicator 26 is visible by a user. Both the first appendage 40 (index finger) and the third appendage 52 (thumb) of the user are shown contacting the touch sensitive panel 22.

In the fifth instance, contact positions of both the first appendage 40 and the third appendage 52 are shown to be distancing during contact with the touch sensitive panel 22. This causes the controller 24 to switch a mode of the control apparatus 20 from the first parameter control mode to the second parameter control mode. A level of the second parameter may either be increased or decreased depending on settings of the control apparatus 20. The visual indicator 26 may show a level of the second parameter once the control apparatus 20 is switched to the second parameter control mode. For example, the level of the second parameter may be depicted in the visual indicator 26 using different colour-ed dots. The visual indicator 26 may revert to showing the level of the first parameter once both the first appendage 40 and the third appendage 52 breaks contact with the touch sensitive panel 22.

In a sixth instance as shown in FIG. 7, the touch sensitive panel 22 is overlaid on the visual indicator 26. The touch sensitive panel 22 is transparent so that the visual indicator 26 is visible by a user. Both the first appendage 40 (index finger) and the third appendage 52 (thumb) of the user are shown contacting the touch sensitive panel 22.

In the sixth instance, contact positions of both the first appendage 40 and the third appendage 52 are shown to be approaching during contact with the touch sensitive panel 22. This causes the controller 24 to switch a mode of the control apparatus 20 from the first parameter control mode to the second parameter control mode. The level of the second parameter may either be increased or decreased depending on settings of the control apparatus 20. If the level of the second parameter is configured to be increased when contact positions of both the first appendage 40 and the third appendage 52 are approaching during contact with the touch sensitive panel 22, the level of the second parameter will decrease when contact positions of both the first appendage 40 and the third appendage 52 are distancing during contact with the touch sensitive panel 22. Conversely, if the level of the second parameter is configured to be decreased when contact positions of both the first appendage 40 and the third appendage 52 are approaching during contact with the touch sensitive panel 22, the level of the second parameter will increase when contact positions of both the first appendage 40 and the third appendage 52 are distancing during contact with the touch sensitive panel 22.

The visual indicator 26 may show a level of the second parameter once the control apparatus 20 is switched to the second parameter control mode. For example, the level of the second parameter may be depicted in the visual indicator 26 using different colour-ed dots. The visual indicator 26 may revert to showing the level of the first parameter once both the first appendage 40 and the third appendage 52 breaks contact with the touch sensitive panel 22.

Figure 8:
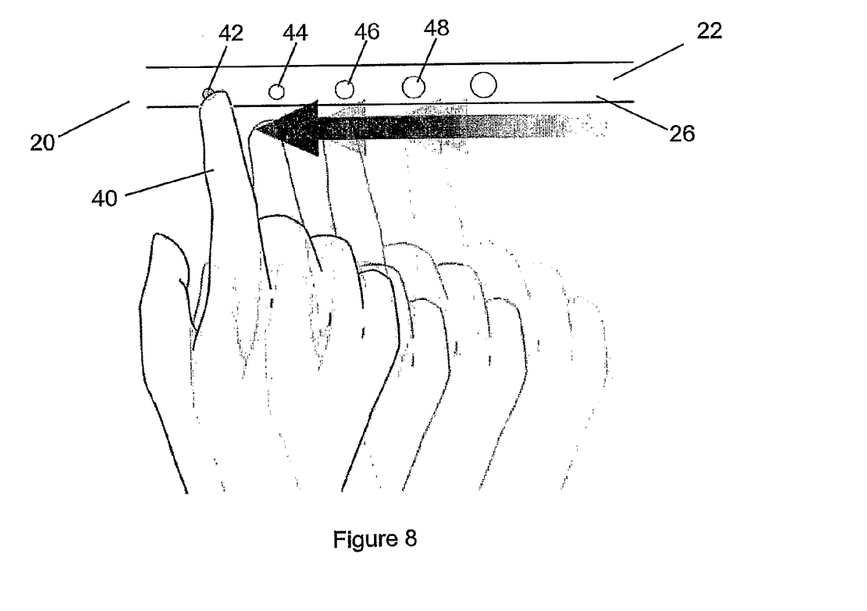
FIG. 8 shows a seventh instance during use of the control apparatus.

Referring to FIG. 8, there is shown a seventh instance during use of the control apparatus 20. It should be noted that the seventh instance shown in FIG. 8 is subsequent to the first instance shown in FIG. 2. However, while the seventh instance is not necessarily immediately subsequent to the first instance, there should not be any intervening event(s) which varies the level of the first parameter between the first and seventh instances.

In the seventh instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. The first appendage 40 (index finger) of the user is shown contacting the touch sensitive panel 22. The first appendage 40 makes a first contact with the fourth dot 48, the fourth dot 48 being lit, where shading of each dot in the Figures representing a lit state. When the fourth dot 48 is lit, it indicates that the first parameter of audio reproduction is at the fourth level above the zero level. The first parameter may be volume of audio reproduction for the seventh instance.

The controller 24 of the control apparatus 20 typically ignores data from the touch sensitive panel 22 when the initial contact position of the first appendage 40 fails to substantially coincide with a position where a current level of the first parameter is shown on the visual indicator 26. It should be noted that "substantially coincide with" includes either at or around the position where the current level of the first parameter is shown on the visual indicator 26. Given that the first instance ends with the fourth dot 48 being lit, the controller 24 will not ignore data from the touch sensitive panel 22 when the first appendage 40 makes the first contact with the lit fourth dot 48 (ie current level of the first parameter of audio reproduction) of the visual indicator 26.

The first appendage 40 of the user is shown moving from right to left while in constant contact with the touch sensitive panel 22 at a rate of movement greater than a pre-determined level. The pre-determined level may be stored in the controller 24. The pre-determined level may be set in a form of milli-metres per milli-second. When the first appendage 40 moves from the fourth dot 48 past third dot 46, second dot 44 to first dot 42 at a rate greater than the pre-determined level, the level of the first parameter is nearly instantaneously reduced to a zero level. As such, moving the first appendage 40 in the right to left direction at a rate greater than the pre-determined level is akin to activating a muting function, since the first parameter is volume in the seventh instance. Alternatively, when the first appendage 40 moves from the first dot 42 past second dot 44, third dot 46 to fourth dot 48 at a rate greater than the pre-determined level, the level of the first parameter is nearly instantaneously increased to a maximum level. In this seventh instance, it may not be necessary for the initial contact positions of the first appendage 40 to substantially coincide with a position where a current level of the first parameter is shown on the visual indicator 26 in order to reduce the level of the first parameter is nearly instantaneously to a zero level.

Figure 9:
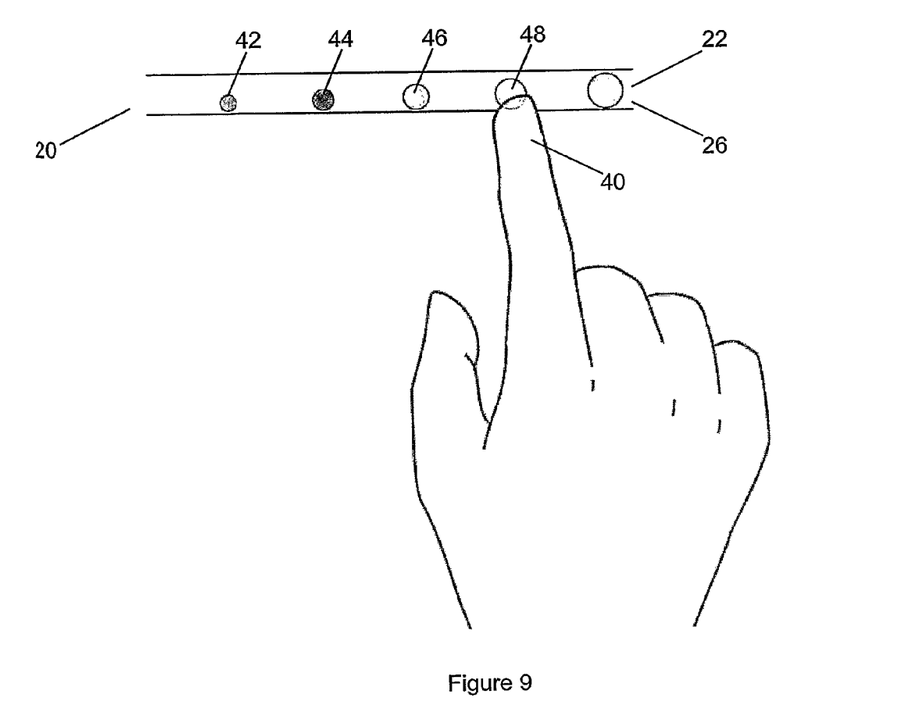
FIG. 9 shows an eighth instance during use of the control apparatus.

Referring to FIG. 9, there is shown an eighth instance during use of the control apparatus 20. In the eighth instance, the visual indicator 26 is a series of dots of increasing diameter when viewed from left to right. The touch sensitive panel 22 is overlaid on the visual indicator 26. The touch sensitive panel 22 is transparent so that the visual indicator 26 is visible by a user. A first appendage 40 (index finger in this instance) of the user is shown contacting the touch sensitive panel 22. The first appendage 40 makes a first contact with the fourth dot 48, the fourth dot 42 being unlit. The current level of the first parameter is at a second level above zero level denoted by illumination of the first dot 42 and the second dot 44.

As the controller 24 of the control apparatus 20 typically ignores data from the touch sensitive panel 22 when the initial contact position of the first appendage 40 fails to substantially coincide with a position where a current level of the first parameter is shown on the visual indicator 26, the contact of the first appendage 40 in the eighth instance is ignored if the rate of movement of the first appendage 40 is less than the pre-determined level as mentioned in the seventh instance. Thus, there is no change in the level of the first parameter in the eighth instance.

Referring to FIG. 11, there is shown a ninth instance during use of the control apparatus 20. It should be noted that the control apparatus 20 shown in the ninth instance has a different visual indicator 26 compared to the visual indicator 26 shown in the first to eighth instances shown in FIGS. 2 to 9. In the ninth instance, the visual indicator 26 comprises two columns of identically sized dots. The visual indicator 26 in this ninth instance is functionally identical to examples mentioned in preceding paragraphs. It should be noted that the ninth instance may be subsequent to any one of the first to eighth instances shown in FIGS. 2 to 9.

Figures 11A, 11B:
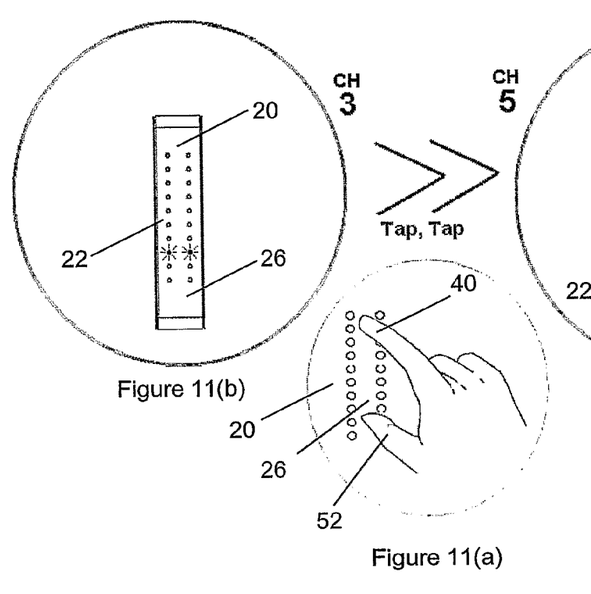
FIG. 11 shows a ninth instance during use of the control apparatus.

In the ninth instance, the touch sensitive panel 22 is overlaid on the visual indicator 26. The touch sensitive panel 22 is transparent so that the visual indicator 26 is visible by a user. The first appendage 40 (index finger) and the third appendage 52 (thumb) of the user is shown contacting the touch sensitive panel 22 in FIG. 11(a), the two appendages being substantially side-by-side. It should be noted that side-by-side may include next to each other and slightly spaced apart. The ninth instance may relate to switching a mode of the control apparatus 20 from a first parameter control mode to a sound reproduction apparatus functionality control mode. The at least one functionality of the sound reproduction apparatus may include, for example, radio channel selection, track selection, album selection, and the like. The ninth instance will use radio channel selection for the sake of illustration. The aforementioned switching of the mode may occur when the controller 24 recognizes tapping contact of either only the first appendage 40 or only the third appendage 52 but not tapping contact of both the first appendage 40 and the third appendage 52. It should be appreciated that positions of contact of the first appendage 40 and the third appendage 52 are not pertinent for the ninth instance.

Figure 11C:
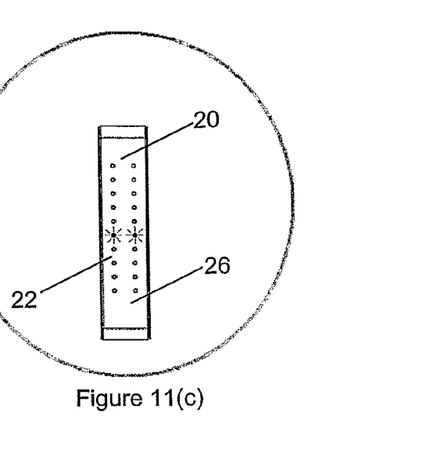

FIG. 11(*b*) shows the control panel 20 after the controller 24 has recognized tapping contact of either only the first appendage 40 or only the third appendage 52 and has correspondingly switched the mode of the control panel 20 to the sound reproduction apparatus functionality control mode. At this juncture, the visual indicator 26 denotes a radio channel (arbitrary channel 3) being played back on the sound reproduction apparatus. Subsequently, when the controller 24 has recognized tapping contact of either only the first appendage 40 or only the third appendage 52, the radio channel being played back on the sound reproduction apparatus is varied. Referring to FIG. 11(*c*), there is shown the visual indicator 26 denoting another radio channel (arbitrary channel 5) being played back on the sound reproduction apparatus. The channel is varied from arbitrary channel 3 to arbitrary channel 5 when the controller 24 has recognized two instances of tapping contact of either only the first appendage 40 or only the third appendage 52. It should be appreciated that even though the ninth instance shows two instances of tapping resulting in a forward scrolling of channels, two instances of tapping may also result in a backward scrolling of channels. In the ninth instance, when the mode of the control apparatus 20 is in the sound reproduction apparatus functionality control mode, non-contact with the control apparatus 20 by any object after a pre-determined time may result in the mode of the control apparatus 20 reverting to the first parameter control mode.

Figure 10:
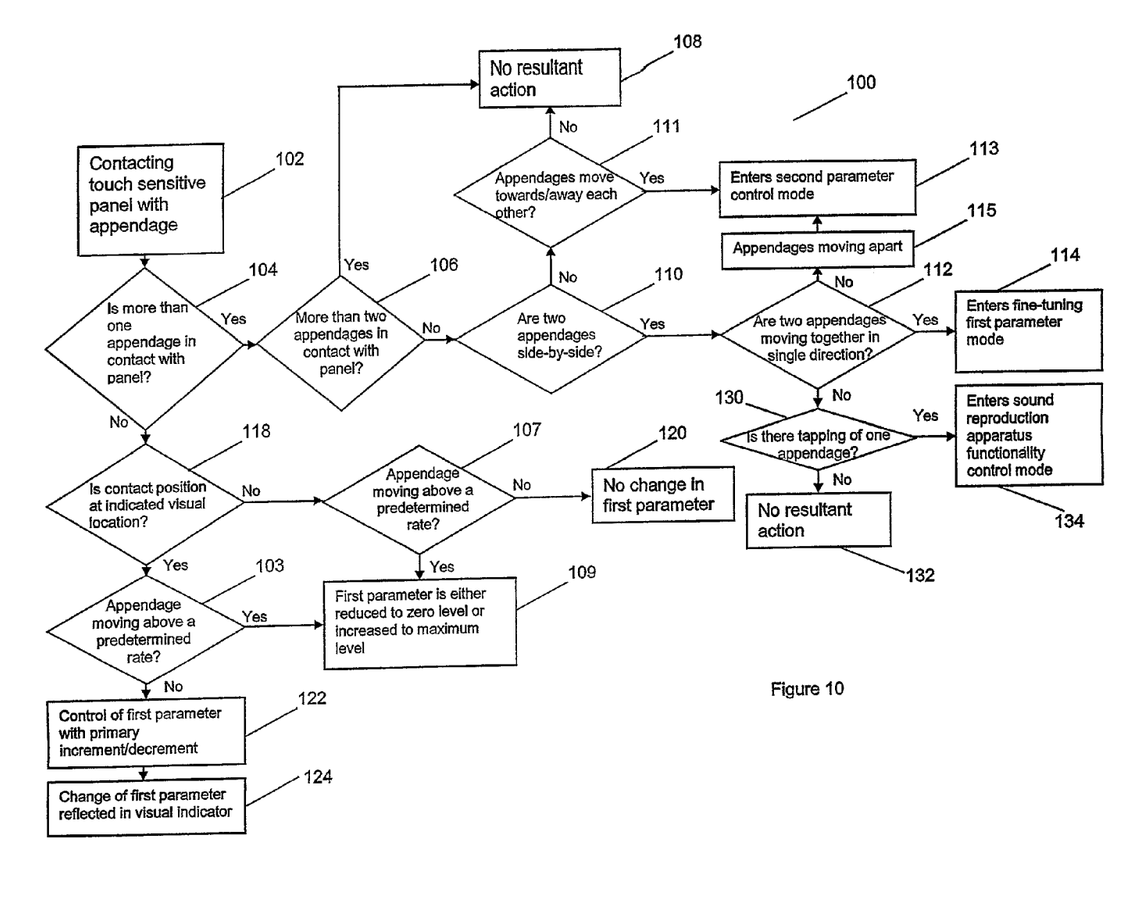
FIG. 10 shows a process flow of a method of the invention.

Referring to FIG. 10, there is shown a process flow for a method 100 for controlling at least one parameter of audio reproduction of a sound reproduction apparatus. The method 100 may be enabled by using the control apparatus 20 as described earlier. The method 100 may also be enabled by a touch sensitive panel over-laid on a visual indicator of the first parameter visible though the touch sensitive panel. A first and a second parameter of audio reproduction may include, for example, volume, bass, treble, equalizer settings and so forth. The sound reproduction apparatus may be, for example, a speaker system comprising at least one loudspeaker, a set of headphones, a set of earphones and so forth.

The method 100 includes contacting the touch sensitive panel using a first appendage 102. The first appendage may be, for example, any finger, thumb, any toe and so forth. The visual indicator may be for denoting a level of the at least one parameter. The visual indicator may include visual indicia, such as, for example, a plurality of illumination sources, a plurality of LEDs, or an LCD panel. Each illumination source may include either at least one bulb or at least one LED. Each of the plurality of LEDs may be able to vary a level of brightness. The level of brightness of each LED may be varied to denote a different level of the at least one parameter. The visual indicator may be, for example, a series of dots as shown in FIGS. 2-9 (the dots being of increasing diameter when viewed from left to right), a series of bars (the bars being of increasing height when viewed from left to right), a series of dots of the same size, a series of dots of the same size closely arranged with each other to appear as a line, and so forth. The visual indicator provides a visual indication of a current level of the at least one parameter.

The method 100 includes determining whether more than one appendage is in contact with the touch panel 104. If only one appendage is in contact with the panel, it is further determined whether the contact position of the appendage substantially coincides with a current visual level 118. If no, and the appendage is not moving above a pre-determined rate while in contact with the touch panel 107, there is no change in the level of the first parameter 120. It should be noted that "substantially coincide with" includes either at or around the position where the current level of the first parameter is shown on the visual indicator.

If the contact position of the first appendage is at a current visual level, it is determined whether the appendage is moving above a pre-determined rate while in contact with the touch panel 103. If the appendage is moving above the predetermined rate while in contact with the touch panel in a single direction, the first parameter is instantaneously either reduced to a zero level or increased to a maximum level, depending on movement direction of the appendage 109. For example, the movement of the appendage above a pre-determined rate in the first direction causes the first parameter to be instantaneously increased to a maximum level, while the movement of the appendage above a pre-determined rate in the second direction causes the first parameter to be instantaneously reduced to a zero level.

The level of the first parameter is increased by primary increments when the first appendage is moved in the first direction, and the level of the first parameter is decreased by primary decrements when the first appendage is moved in the second direction 122, with the visible indicator appearing to correspondingly vary with a direction of movement of the first appendage 124 when the first appendage is in contact with the touch sensitive panel. The first and second directions may be selected from, for example, latitudinal, longitudinal, radial and any combination of the aforementioned.

If more than one appendage is detected to be in contact with the touch panel, it is further determined whether more than two appendages are in contact with the touch panel 106. Each appendage may be, for example, any finger, thumb, any toe and so forth. If more than two appendages are detected in contact with the touch panel, there is no resultant action 108.

If two appendages are detected to be in contact with the touch panel, it is subsequently detected whether the two appendages are located in side-by-side positions 110. It should be noted that side-by-side may include next to each other and slightly spaced apart. If the two appendages are determined to be located in side-by-side positions, it is further determined whether the two appendages are moving together in a single direction 112. The single direction may be selected from, for example, latitudinal, longitudinal, radial and any combination of the aforementioned.

If the two appendages are not moving together in the same direction, the first appendage and the second appendage may be moving apart 115. If it is determined that the first appendage and the second appendage are moving away from one another, the control mode is switched from a first parameter control mode to a second parameter control mode 113.

Alternatively, if the two appendages are not moving together in the same direction, there may be determination of whether there is tapping on the touch panel by one of the appendages 130. If it is determined that one of the appendages is tapping on the touch panel, the control mode is switched from the first parameter control mode to a sound reproduction apparatus functionality control mode 134. In the sound reproduction apparatus functionality control mode 134, when there is detection of tapping contact of only one of the appendages, the function being controlled on the sound reproduction apparatus is varied. If it is determined that none of the appendages are tapping onto the touch panel, there is also no resultant action 132.

If the two appendages are moving together in the single direction, a control mode is switched from a first parameter control mode to a fine-tuning first parameter mode 114. In the fine-tuning first parameter mode, the level of the first parameter is increased in secondary increments when the contact positions of the first appendage and the second appendage that are substantially side-by-side are moved in the first direction, and the level of the first parameter is decreased in secondary decrements when the contact positions of the first appendage and the second appendage that are substantially side-by-side are moved in the second direction. Thus, when both the first appendage and the second appendage of the user are moved side-by-side in the single direction, there should be a change in the level of the first parameter, but the change in the level is not sufficient to affect an appearance of the visual indicator. It should be noted that the secondary increment is less than the primary increment and the secondary decrement is less than the primary decrement.

When the first appendage and the second appendage are determined to be not side-by-side, it is determined whether the first appendage and the second appendage either move towards or away from one another 111. If it is determined that the first appendage and the second appendage are neither moving towards or away from one another when in contact with the touch panel, there is again no resultant action 108. If it is determined that the first appendage and the second appendage are either moving towards or away from one another, the control mode is switched from a first parameter control mode to a second parameter control mode 113. In the second parameter control mode, a level of the second parameter is increased when the contact positions of the first appendage and the second appendage are approaching one another, and the level of the second parameter is decreased when the contact positions of the first appendage and the second appendage are distancing from one another. Alternatively, a level of a second parameter is increased when the contact positions of the first appendage and the second appendage are distancing from one another, and the level of the second parameter is decreased when the contact positions of the first appendage and the second appendage are approaching one another. Each of the first parameter and the second parameter of audio reproduction may be, for example, volume, bass, treble, equalizer settings and so forth.

Whilst there has been described in the foregoing description preferred embodiments of the present invention, it will be understood by those skilled in the technology concerned that many variations or modifications in details of design or construction may be made without departing from the present invention.

The invention claimed is:

1. A control apparatus for controlling at least one parameter of audio reproduction of a sound reproduction apparatus, the at least one parameter being associable with a current level which is variable, the control apparatus including:
   a touch sensitive panel operable to communicate data based on contact thereon;
   a controller coupled to the touch sensitive panel for processing communicated data from the touch sensitive panel, data communicated from the touch sensitive panel being processable by the controller in a manner such that variance of the current level is determinable based on contact on the touch sensitive panel; and
   a visual indicator coupled to the controller, the visual indicator configured such that a visual indication is providable by visually denoting the current level and the variance determinable in association thereto, the visual indicator and the touch sensitive panel being arranged in a manner such that contact on the touch sensitive panel one of substantially coincides and fails to substantially coincide with the visual indication denoting the current level,
   wherein when contact on the touch sensitive panel substantially coincides with the visual indication which denotes the current level, the controller processes data communicated from the touch sensitive panel in a manner such that variance of the current level of the at least one parameter is determined;
   wherein when contact on the touch sensitive panel fails to substantially coincide with the visual indication which denotes the current level, the controller ignores data communicated from the touch sensitive panel;
   wherein the control apparatus is operable in one of a first parameter control mode and a fine-tuning first parameter mode;
   wherein when the controller recognizes contact to the touch sensitive panel by one of a first appendage and a second appendage, the control apparatus operates in the first parameter control mode, and variance of the current level of the at least one parameter is determined in a manner such that the level is increased by primary increments when the first appendage is moved in the first direction and the level is decreased by primary decrements when the first appendage is moved in the second direction;
   wherein when the controller recognizes contact to the touch sensitive screen by the first appendage and the second appendage in a manner such that they are substantially side-by-side together, the control apparatus operates in the fine-tuning first parameter mode; and variance of the current level of the at least one parameter is determined in a manner such that the level is increased in secondary increments when the first appendage and the second appendage are moved in the first direction, and the level is decreased in secondary decrements when the first appendage and the second appendage are moved in the second direction; and
   wherein the secondary increment is less than the primary increment and the secondary decrement is less than the primary decrement.

2. The control apparatus of claim 1 wherein the touch sensitive panel is transparent and is over-laid on the visual indicator.

3. The control apparatus of claim 2, wherein contact on the touch sensitive panel is established by a first appendage which is movable in one of a first direction and a second direction when in contact with the touch sensitive panel, and wherein when contact on the touch sensitive panel substantially coincides with the visual indication denoting the current level.

4. The control apparatus of claim 3,
   wherein data communicated from the touch sensitive panel relates to at least one of an initial contact position, direction of subsequent movement, a rate of the movement and a departing contact position, of the first appendage on the touch sensitive panel, and
   wherein the subsequent movement is in a direction selected from a group comprising: latitudinal, longitudinal, radial and any combination of the aforementioned.

5. The control apparatus of claim 3, wherein the visual indicator includes visual indicia selected from a group comprising: a plurality of illumination sources, a plurality of LEDs and an LCD panel.

6. The control apparatus of claim 5, wherein each of the plurality of LEDs is able to vary a level of brightness.

7. The control apparatus of claim 3, wherein contact on the touch sensitive panel is further established by a second appendage which is movable in one of a first direction and a second direction when in contact with the touch sensitive panel.

8. The control apparatus of claim 1, wherein the control apparatus operates in the fine-tuning first parameter mode when contact of at least one of the first and second appendages substantially coincides with the visual indication which denotes the current level.

9. A method for controlling at least one parameter of audio reproduction of a sound reproduction apparatus using a touch sensitive panel over-laid on a visual indicator, the at least one parameter being associable with a current level which is variable and which is visually denotable via the visual indicator by way of a visual indication in a manner such that the current level and any variance in association thereto is visible though the touch sensitive panel, the method including:
contacting the touch sensitive panel in a manner such that contact on the touch sensitive panel one of substantially coincides and fails to substantially coincide with the visual indication denoting the current level; and
determining whether contact on the touch sensitive panel substantially coincides with the visual indication denoting the current level,
wherein when contact on the touch sensitive panel substantially coincides with the visual indication denoting the current level, the current level is varied based on contact on the touch sensitive panel;
wherein when contact on the touch sensitive panel fails to substantially coincide with the visual indication denoting the current level, the current level is not varied regardless of contact on the touch sensitive panel;
wherein the touch sensitive panel overlaid on the visual indicator is associable with a control apparatus which is operable in one of a first parameter control mode and a fine-tuning first parameter mode;
wherein when contact to the touch sensitive panel is established by one of a first appendage and a second appendage, the control apparatus operates in the first parameter control mode, and variance of the current level of the at least one parameter is determined in a manner such that the level is increased by primary increments when the first appendage is moved in the first direction and the level is decreased by primary decrements when the first appendage is moved in the second direction;
wherein when contact to the touch sensitive screen is established by the first appendage and the second appendage in a manner such that they are substantially side-by-side together, the control apparatus operates in the fine-tuning first parameter mode, and variance of the current level of the at least one parameter is determined in a manner such that the level is increased in secondary increments when the first appendage and the second appendage are moved in the first direction, and the level is decreased in secondary decrements when the first appendage and the second appendage are moved in the second direction; and
wherein the secondary increment is less than the primary increment and the secondary decrement is less than the primary decrement.

10. The method of claim 9, wherein the visual indicator includes visual indicia selected from a group comprising: a plurality of illumination sources, a plurality of LEDs and an LCD panel.

11. The method of claim 10, wherein each of the plurality of LEDs is able to vary a level of brightness.

12. The method of claim 9, wherein contact on the touch sensitive panel is established by a first appendage which is movable in one of a first direction and a second direction when in contact with the touch sensitive panel, and wherein when contact on the touch sensitive panel substantially coincides with the visual indication.

13. The method of claim 12, wherein the first and the second directions are selected from a group comprising: latitudinal, longitudinal, radial and any combination of the aforementioned.

14. The method of claim 12, wherein contact on the touch sensitive panel is further established by a second appendage which is movable in one of a first direction and a second direction when in contact with the touch sensitive panel.

15. The method of claim 14, wherein the touch sensitive panel overlaid on the visual indicator is associable with a control apparatus which is further operable in one of a second parameter control mode and a functional control mode, and
wherein when contact to the touch sensitive screen is established by the first and second appendages, the control apparatus operates in one of the second parameter control mode and the functional control mode.

16. The method of claim 15, wherein the control apparatus operates in the second parameter control mode when the first and second appendages contact the touch sensitive panel in a manner such that they are either approaching one another or distancing from one another.

17. The method of claim 15, wherein the control apparatus operates in the functional control mode when the first and second appendages contact the touch sensitive panel in a manner such that they are substantially side-by-side together and either one of them taps on the touch sensitive panel.

* * * * *